Patented July 11, 1939

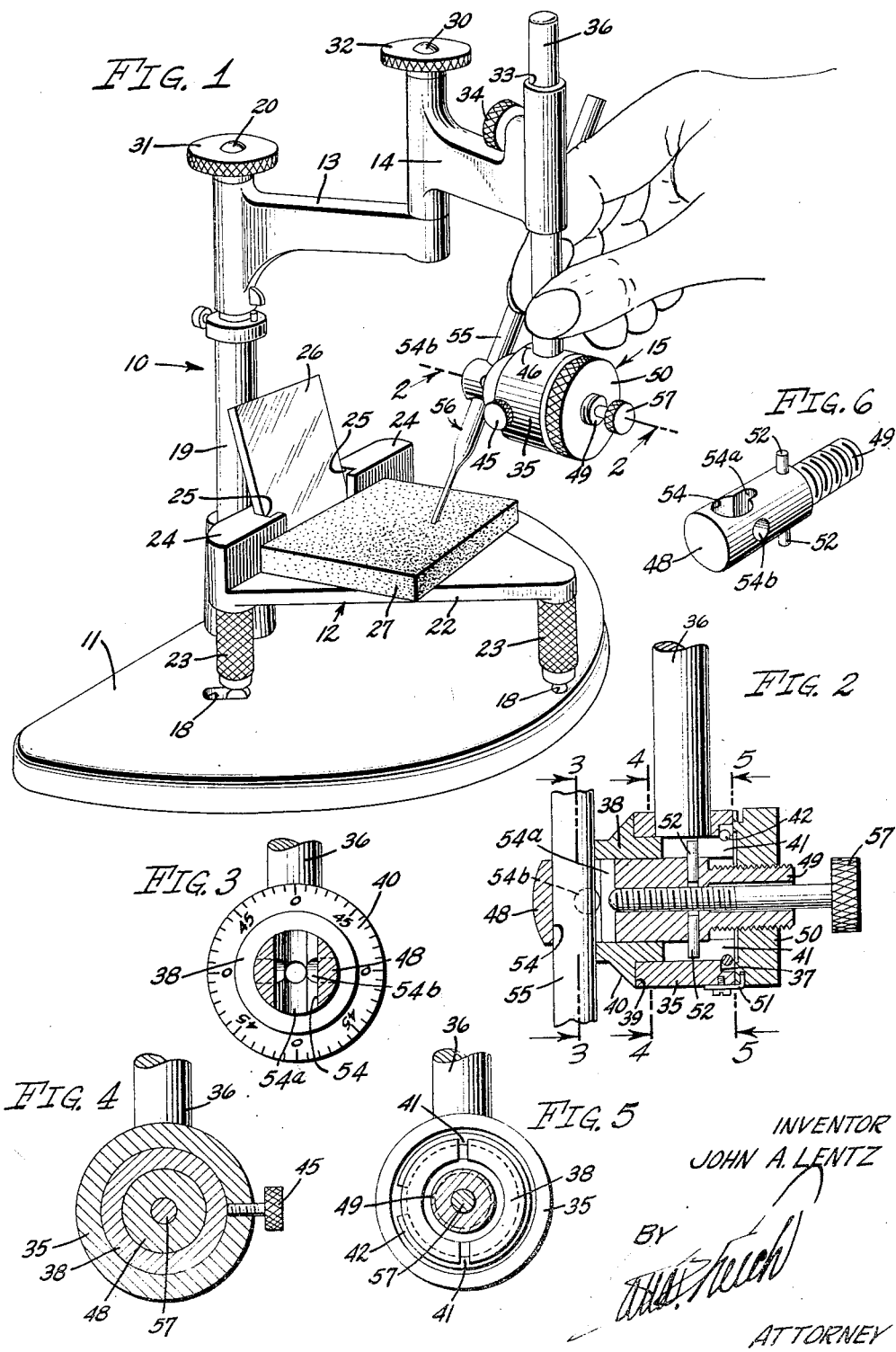

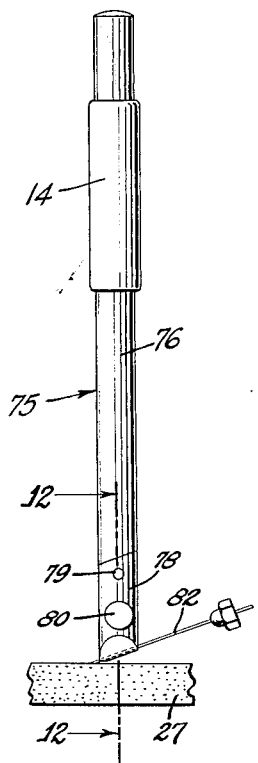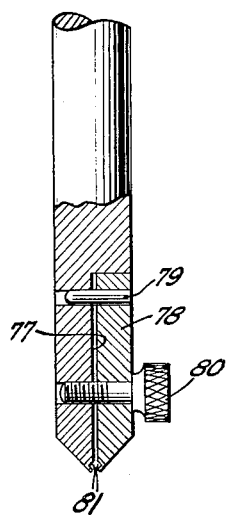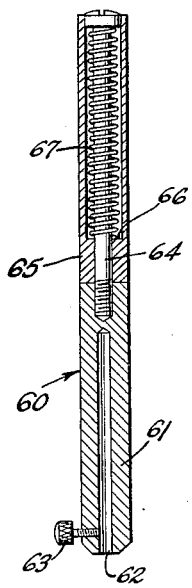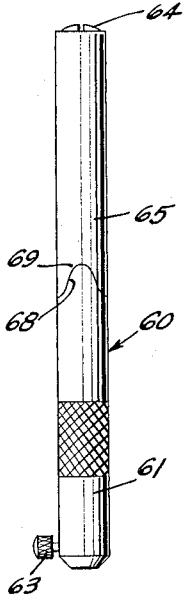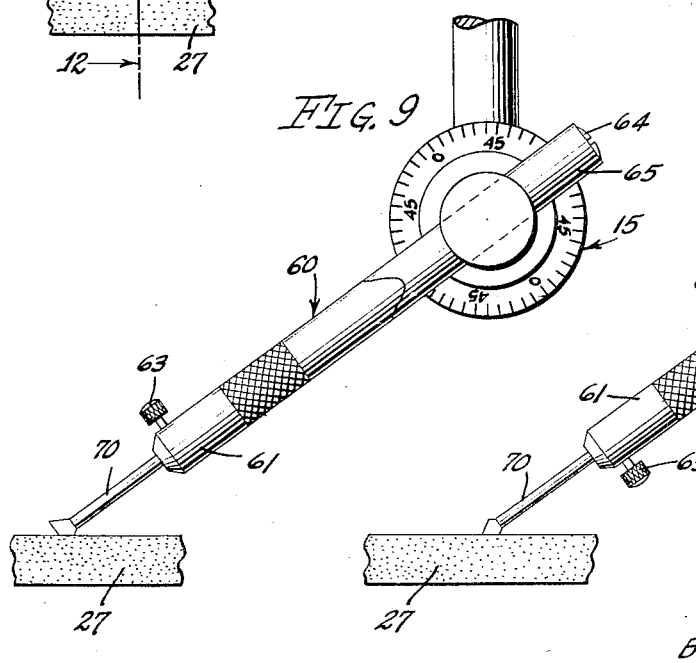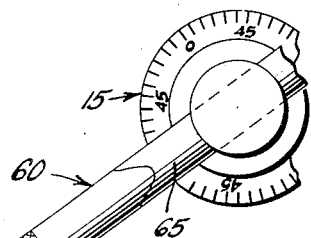

2,165,929

UNITED STATES PATENT OFFICE 2,165,929

INSTRUMENT SHARPENER

John A. Lentz, Phoenix, Ariz.

Application April 9, 1937, Serial No. 135,919

11 Claims. (Cl. 51—157)

My invention relates to dentistry and particularly to a device for sharpening dental instruments and the like.

Many dental operations such as cleaning teeth, preparing cavities for fillings, etc., are done with instruments known as scalers and chisels. The efficiency of such instruments depends largely upon their being ground at the proper angle and having a sharp cutting edge. The sharpening of these tools is usually done by hand on a flat, fine grained stone and the degree of accuracy and sharpness obtained depends entirely upon the skill of the operator. It is to be noted that such instruments are usually very small at their cutting edges, considerable care and skill being required in order to obtain even mediocre results. This is particularly true in reference to hypodermic needles which should be sharp and properly ground in order to minimize pain and the force required for entrance into the tissues. Due to the small size and flexibility of these needles, accurate sharpening by hand is difficult to accomplish because of inability to hold the extreme point inflexible against bending and to maintain the angle of the needle in constant relation to the surface of the stone during the sharpening operation. It is also true that persons using such needles are not necessarily familiar with the correct angle at which the needle should be held while sharpening.

The principal objects of my invention are: to provide an instrument sharpener which will maintain a constant angular relation between the instrument and stone and yet allow free relative movement between the stone and instrument; to permit stones of different thicknesses to be substituted for one another in the apparatus of my invention without affecting the established angular relation between the instrument to be sharpened and the abrading surface against which the instrument is held; to provide a sharpener in which the shank of an instrument may be set to and held at a predetermined angular relation to the grinding surface, particularly when the instrument is marked to denote the angle of the shank in relation to the surface to be ground; to provide a chuck for use with a sharpener by means of which the shank of an instrument to be sharpened may be set against rotation on its longitudinal axis independently of setting the instrument to proper angular relation to the stone; to provide an instrument holding chuck in which the rotative position of the shank of an instrument as well as the angular relation of the shank to the stone may be set simultaneously if so desired; to provide an instrument holding chuck for use with the sharpener of my invention in which a series of instruments requiring the same angulation to the stone may be successively sharpened without resetting the angulation of the chuck for each instrument; to provide a sharpener in which dental drills may be produced by grinding drill points on discarded dental burrs; to provide a sharpener in which a mirror may be suitably mounted to enable the operator to conveniently view all sides of the instrument point to facilitate setting the instrument in proper relation to the stone for sharpening.

Other objects and advantages of my invention will become apparent in the following description, in view of the accompanying drawings, in which:

Fig. 1 is a perspective view of a preferred embodiment of my invention.

Fig. 2 is an enlarged, fragmentary sectional view taken on the line 2—2 of Fig. 1.

Figs. 3, 4 and 5 are vertical sectional views taken on the lines 3—3, 4—4 and 5—5 respectively of Fig. 2.

Fig. 6 is a detail perspective view of a part of the device shown in Fig. 2.

Fig. 7 is a side elevational view of an instrument holding device for use in connection with the sharpener of my invention.

Fig. 8 is a vertical sectional view of the device shown in Fig. 7.

Figs. 9 and 10 are operation views illustrating the use of the device shown in Fig. 7.

Fig. 11 is an elevational view of another form of instrument holding device for use with my invention.

Fig. 12 is an enlarged, fragmentary sectional view taken on the line 12—12 of Fig. 11.

Referring specifically to the drawings, a preferred form of instrument sharpener 10 of my invention is shown in Fig. 1, this device including a base 11, a tripod 12, arms 13 and 14 and an instrument holding chuck 15.

The base 11 is preferably made of cast metal to provide suitable cavities 18 on the upper surface thereof and an upstanding post 19, the latter being reduced in diameter at its upper end to provide a stud 20. The tripod 12 includes a body 22 and legs 23, the lower extremities of which are received by the cavities 18 of the base 11. The legs 23 are threaded onto suitable studs (not shown) which are fixed to the three corners of the tripod 12. Formed integral with the body 22 are upstanding lugs 24 formed on their inner opposed sides to provide slots 25 for receiving and supporting a mirror 26, the latter being disposed at an angle as shown in Fig. 1. Resting on the tripod 12 against the lugs 24 is a sharpening stone 27.

The arm 13 pivoted on the stud 20 of the post 19, has a stud 30 fixed on the free end thereof. Threaded onto the upper extremities of the studs 20 and 30 are lock nuts 31 and 32. The arm 14, swingable on the stud 30 of the arm 13, is formed at its extremity to provide a vertical hole 33 into which a set screw 34 extends.

The instrument holding chuck 15 includes an annular body portion 35 to which a stem 36 is fixed. As shown in Fig. 2 the body 35 is counterbored to provide a shoulder 37. Rotatable within the body 35 is a sleeve 38 having a shoulder 39 and a graduated surface 40 as seen in Fig. 3. Formed in the sleeve 38 are diametrically opposed slots 41 as seen in Figs. 2 and 5. Received in a suitable groove in the sleeve 38 is a spring wire ring 42, the latter bearing against the shoulder 37 to retain the sleeve 38 within the body 35. The sleeve 38 is normally rotatable within the body 35 but may be locked when so desired by a set screw 45 shown in Fig. 4. Provided on the center of the top side of the body 35 is a mark 46 as shown in Fig. 1 for registration with the graduations on the surface 40 of the sleeve 38. Slidable within the sleeve 38 is a clamp 48 having a threaded portion 49 and lock nut 50, the latter being retained against the body 35 by a keeper 51. Extending transversely from the clamp 48 are pins 52, the extremities of which are received by the slots 41 of the sleeve 38, the clamp 48 being retained against rotation within the sleeve 38 by the pins 52. Extending transversely through the clamp 48 is a hole 54 having a groove 54a on one side thereof. Extending through the clamp 48 in right-angular relation to the hole 54 is a smaller hole 54b. The hole 54 is adapted to receive the shank 55 of an instrument 56 to be sharpened. The groove 54a is provided for the following purpose: certain chisels used by dentists in connection with denture work have cutting edges substantially wider than the diameter of their shanks and enlarged handle portions at the extremity of the shanks. As it is desirable to have the hole 54 fit the shank of such chisels as closely as possible, the groove 54a permits insertion of the cutting edge without enlarging the entire hole. The smaller hole 54b is provided to receive the shanks of certain small instruments. Threaded centrally within the clamp 48 is a lock screw 57, the purpose of which will be described hereinafter.

*Operation*

The sharpener 10 of my invention is used in the following manner:

The sleeve 38 of the chuck 15 is set at the desired angle and locked by the screw 45. The shank 55 of the instrument 56 is inserted into the hole 54 and locked against the sleeve 38 by tightening the lock nut 50, the stem 36 of the chuck 15 being allowed to slide vertically within the hole 33 of the arm 14 until the point of the instrument 56 comes to rest on the stone 27 as shown in Fig. 1. The lock nuts 31 and 32 are loosened allowing the chuck 15 to be swung in any desired path to sharpen the point of the instrument 56 on the stone 27, it being clear that the stem 36 of the chuck 15 is allowed to rotate or move vertically within the hole 33 during the sharpening operation. The mirror 26 being inclined as shown enables the operator to see from all sides the exact relation between the surface of the stone 27 and the point of the instrument 56 without the inconvenience of lowering his eye level to the horizontal level of the stone 27.

If it is desirable to retain the position of the shank 55 in the clamp 48 while setting the shank of the instrument 56 to a different angular relation to the stone 27, the lock screw 57 is tightened against the shank 55 thus holding the shank 55 while the lock nut 50 is loosened to permit resetting the sleeve 38.

After the point of the instrument 56 is ground, the extreme cutting edge may be finally sharpened to a slightly different bevel by slightly inclining the stone 27. This may be accomplished by unscrewing one of the legs 23 thus raising one corner of the tripod 12. The instrument is then moved toward the raised corner of the tripod in a rectilinear motion to accomplish the final grinding of the cutting edge. In instruments where the cutting edge is at right angles to the shank, the same result could be accomplished by changing the angle of the chuck while holding the instrument against rotation by set screw 57, but the latter method would not be applicable where the cutting edge and shank are not at right angles which is commonly the case.

It should be noted also that although the angle of shank to stone and rotative position of shank in chuck are independently adjustable, they may both be adjusted simultaneously by lock nut 50, with screws 45 and 57 loosened.

While not shown in drawings it is contemplated within the scope of the invention to substitute a motor driven rotative stone for the stationary one shown.

Referring now to Figs. 7 to 10 inclusive of the drawings, I have shown therein a holder 60 for use with the sharpener 10 of my invention. The holder 60 includes a chuck 61 having a central hole 62 and set screw 63. Screwed into the upper end of the chuck 61 is a screw 64 about which a stem 65 is rotatably mounted. As shown in Fig. 8 the stem 65 is counter-bored to provide a shoulder 66, there being a compression spring 67 disposed about the screw 64 between the head of the screw and the shoulder 66. As seen in Fig. 7 the abutting ends of the chuck 61 and stem 65 are formed to provide complementary cam surfaces 68 and 69. The purpose of the holder 60 is primarily for making drills out of worn dental burrs. To use the holder 60 the chuck 15 is employed as shown in Fig. 9. A burr 70, preferably of the inverted cone type, is secured within the chuck 61 and ground on the stone 27 in the aforedescribed manner until one side thereof is flattened as shown in Fig. 9. The chuck 15 is then raised and and the chuck portion 61 of the holder 60 is rotated relative to the stem 65 and is automatically indexed after rotating 180 degrees by the cam surfaces 68 and 69. The grinding process is then continued until a sharp edge is obtained on the lower end of the burr as shown in Fig. 10. The holder 60 thus provides a simple, easily operated means for grinding a sharp, accurate drill point on a burr.

Referring now to Figs. 11 and 12, I have shown therein another holder 75 having a shank 76 slidable within the hole 33 of the arm 14. The lower end of the shank 76 is cut away to provide a flat surface 77. Mounted adjacent the surface 77 is a jaw 78 held in alignment by a pin 79 and lock screw 80. Formed on the surface 77 and jaw 78 are aligned grooves 81 for receiving the point of a hypodermic needle 82 as shown in Fig. 11, the needle being clamped in position by tightening the screw 80. The angularity of the grooves 81 holds the needle 82 in proper relation to the stone 27 thus insuring a properly ground point when the holder 75 is moved back and forth over the stone 27 in the aforedescribed manner.

Although I have shown and described but one preferred form of sharpener of my invention and two modified forms of attachments for use therewith, it is understood that various changes and modifications might be made therein without departing from the spirit of the invention or the scope of the appended claims.

I claim as my invention:

1. In an instrument sharpener, the combination of: a base; a stone on said base having a flat, abrasive surface; an arm pivoted on said base, said arm being swingable in a plane above said stone in parallel relation with said abrasive surface; a second arm pivoted on the free end of said first arm, the plane of movement of said second arm being parallel with the plane of said first arm; a chuck for holding an instrument to be sharpened on said stone, said chuck having a stem; and means on the free end of said second arm for receiving and supporting said stem in perpendicular sliding relation to the abrasive surface of said stone, said instrument being sharpened by swinging said second arm, the contact between said instrument and said stone being constantly maintained by the said slidable relation between said stem and said second pivoted arm.

2. In a device for sharpening hypodermic needles and the like, the combination of: a stone having a flat grinding face; a base for supporting said stone with said face lying in a given plane; an arm having a hole therethrough; a chuck shank slidably mounted in said hole; means on said shank for holding a hypodermic needle with the point thereof disposed in a given angular relation with said stone and pointing towards the latter; and means for mounting said arm on said base to restrict the motion of said shank to preserve the aforesaid angular relation of said needle with said surface but permitting relatively free movement of said shank to bring said needle into engagement with various portions of said grinding surface while maintaining said angular relation.

3. In combination, means for supporting a grinding stone in a fixed position with a grinding surface of said stone in a given plane; means for adjustably holding a tool to be ground on said surface; and a mirror in the line of vision of the operator and on the opposite side of said tool from said operator to permit observation by said operator from a single position of the relation of opposite portions of said tool to said surface.

4. In combination, means for supporting a grinding stone in a fixed position with a grinding surface of said stone in a given plane; means for adjustably holding a tool to be ground on said surface; a mirror in the line of vision of the operator and on the opposite side of said tool from said operator to permit observation by said operator from a single position of the relation of opposite portions of said tool to said surface; and means for maintaining said tool holding means in a given relation to said grinding surface and yet permit movement of said tool holding means and said tool in a plane parallel with said surface for the purpose of grinding said tool.

5. In an instrument sharpener, the combination of: a base, a stone on said base having a flat abrasive surface, an arm pivoted on said base, said arm swinging in a plane above and normally parallel with said abrasive surface, means on the free end of said arm for holding an instrument to be sharpened with freedom of movement of said instrument perpendicularly to the plane of swinging of said arm, said instrument being sharpened by oscillating said arm; and means for inclining said stone by definite mechanical means to produce a desired angular relation between said abrasive surface and the plane of movement of said swinging arm, said inclining means comprising a tripod support for said stone, said tripod being adjustable to give desired angularity to said abrasive surface to render said abrasive surface parallel or non-parallel, as the case may be, relative to the aforesaid plane in which said arm pivotally swings.

6. In an instrument sharpener, the combination of: a base; a stone on said base having a flat, abrasive surface; a chuck stem; means for rigidly holding said chuck stem in a definite angular relation with said abrasive surface while permitting movement of said stem along its axis; an annular body provided on said stem; a sleeve rotatable in said body; a clamp member slidable within said sleeve and keyed against rotation relative to said sleeve, one end of said clamp member having a transverse hole therethrough for receiving the shank portion of an instrument, the opposite end of said clamp member being threaded to receive a clamp nut, the shank of said instrument being clamped against one end of said sleeve in response to tightening said nut; and means for locking said sleeve against rotation in said body while permitting said clamp member to slide freely within said sleeve, the angularity of the shank of said instrument in relation to the stem of said chuck being determined by the position at which said sleeve is locked within said annular chuck body.

7. In an instrument sharpener, the combination of: a base; a stone on said base having a flat, abrasive surface; a chuck stem; means for rigidly holding said chuck stem in a definite angular relation with said abrasive surface while permitting movement of said stem along its axis; a chuck rotatable on said stem for holding a dental burr with an end of the burr resting on said abrasive surface; and detent means for detaining said chuck against rotation at either of two positions located 180 degrees apart, said chuck being adapted to be manually shifted from one of said positions to the other of said positions to facilitate the grinding of diametrically opposite faces on said burr.

8. In an instrument sharpener, the combination of: a base; a stone on said base having a flat, abrasive surface; a chuck stem; means for rigidly holding said chuck stem in a definite angular relation with said abrasive surface while permitting movement of said stem along its axis; a chuck adapted for holding a dental burr, said chuck being rotatably mounted on said stem in an abutting relation therewith, and having complementary cam surfaces on the abutting portions of said stem and said chuck, said cam surfaces detaining said chuck against rotation relative to said stem at either of two positions located 180 degrees apart; and spring means for urging said stem and said chuck together with said chuck located in one or the other of the aforesaid positions.

9. In an instrument sharpener the combination of: a base; an abrasive member on said base, said member having an exposed flat abrasive surface; an arm; means pivoting said arm on said base to swing about an axis perpendicular to said abrasive surface; a chuck stem; bearing means provided on the free end of said arm for slidably receiving said stem and maintaining the latter in a given angular relation with said flat abrasive surface yet permitting said stem to freely slide along its axis towards or away from said surface; and a chuck provided on the lower end of said stem for holding an instrument at a given angle relative to said stem, said instrument being adapted to be sharpened by the swinging of said arm about said pivot axis and the maintaining of a constant sliding relation between said stem and said bearing means while permitting said instrument to rest on said abrasive surface.

10. In an instrument sharpener the combination of: a base; an abrasive member mounted on said base and exposing a flat abrasive surface; an arm pivoted on said base on an axis perpendicular to said surface; a second arm pivoted on the free end of said first arm on an axis parallel with said first mentioned axis; instrument holding means; a member mounted on the free end of said second arm and slidably related thereto along a fixed sliding axis; and means on the lower end of said member for holding an instrument at a desired angle relative to said sliding axis, pivotal movement of said arms relative to each other and to said base and sliding movement of said sliding means relative to said second arm permitting said instrument to be brought into and maintained in grinding contact with said abrasive surface and moved freely thereover while maintaining a fixed angular relation between said instrument and said surface.

11. A combination as in claim 9, in which said chuck including an annular body portion attached to said stem; a member rotatable in said body; means for locking said member against rotation in said body; and means for clamping the shank of an instrument to said member, the angular relation between the stem of said chuck and the shank of said instrument being determined by the position at which said member is locked to said chuck body.

JOHN A. LENTZ.